US007949856B2

(12) United States Patent
Knowles

(10) Patent No.: US 7,949,856 B2
(45) Date of Patent: May 24, 2011

(54) METHOD AND APPARATUS FOR SEPARATE CONTROL PROCESSING AND DATA PATH PROCESSING IN A DUAL PATH PROCESSOR WITH A SHARED LOAD/STORE UNIT

(75) Inventor: Simon Knowles, Bath (GB)

(73) Assignee: Icera Inc. (GB)

( * ) Notice: Subject to any disclaimer, the term of this patent is extended or adjusted under 35 U.S.C. 154(b) by 0 days.

(21) Appl. No.: 10/813,628

(22) Filed: Mar. 31, 2004

(65) Prior Publication Data
US 2005/0223193 A1    Oct. 6, 2005

(51) Int. Cl.
    *G06F 9/30*    (2006.01)
(52) U.S. Cl. ........................................................ 712/215
(58) Field of Classification Search ................. 712/210, 712/1–4, 7, 9, 10, 11, 13, 16, 22, 24, 208, 712/214–215, 220, 221, 223, 225
See application file for complete search history.

(56) References Cited

U.S. PATENT DOCUMENTS

| 5,423,051 A | 6/1995 | Fuller et al. |
| 5,600,801 A | 2/1997 | Parks et al. |
| 5,600,810 A | 2/1997 | Ohkami et al. |
| 5,737,631 A | 4/1998 | Trimberger |
| 5,922,065 A | 7/1999 | Hull et al. |
| 5,956,518 A * | 9/1999 | DeHon et al. .................. 712/15 |
| 6,061,367 A | 5/2000 | Siemers |
| 6,115,806 A | 9/2000 | Yoshida |
| 6,292,845 B1 * | 9/2001 | Fleck et al. ........................ 710/5 |
| 6,526,430 B1 | 2/2003 | Hung et al. |
| 6,725,357 B1 * | 4/2004 | Cousin ............................ 712/214 |
| 6,880,150 B1 * | 4/2005 | Takayama et al. .............. 717/127 |
| 6,976,250 B2 | 12/2005 | Takayama et al. |
| 7,234,042 B1 * | 6/2007 | Wilson ........................... 712/215 |

(Continued)

FOREIGN PATENT DOCUMENTS

EP    0789297 A2    5/1996

(Continued)

OTHER PUBLICATIONS

"Variable Length Instruction Compression for Area Minimization", Piia Simonen, Ilkka Saastamoinen, Jari Nurmi, 2003, IEEE,, p. 3.*

(Continued)

*Primary Examiner* — Alford W Kindred
*Assistant Examiner* — Richard B Franklin

(57) ABSTRACT

According to embodiments of the invention, there is disclosed a computer processor architecture; and in particular a computer processor, a method of operating the same, and a computer program product that makes use of an instruction set for the computer. In one embodiment according to the invention, there is provided a computer processor comprising: a decode unit for decoding a stream of instruction packets from a memory, each instruction packet comprising a plurality of instructions; a first processing channel comprising a plurality of functional units and operable to perform control processing operations; a second processing channel comprising a plurality of functional units and operable to perform data processing operations; wherein the decode unit is operable to receive an instruction packet and to detect if the instruction packet defines (i) a plurality of control instructions or (ii) a plurality of instructions one or more of which is a data processing instruction, and wherein when the decode unit detects that the instruction packet comprises a plurality of control instructions said control instructions are supplied to the first processing channel for execution in program order.

29 Claims, 3 Drawing Sheets

U.S. PATENT DOCUMENTS

| | | | |
|---|---|---|---|
| 2002/0010852 A1 | 1/2002 | Arnold et al. | |
| 2002/0063577 A1 | 5/2002 | Abbott | |
| 2002/0174266 A1 | 11/2002 | Palem et al. | |
| 2003/0154358 A1 | 8/2003 | Nak-Hee et al. | |
| 2004/0054876 A1* | 3/2004 | Grisenthwaite et al. | 712/218 |
| 2004/0215593 A1 | 10/2004 | Sharangpani et al. | |
| 2005/0044434 A1 | 2/2005 | Kahle et al. | |
| 2005/0223196 A1 | 10/2005 | Knowles | |

FOREIGN PATENT DOCUMENTS

| | | |
|---|---|---|
| JP | 9212361 A | 8/1997 |
| JP | 11282674 A | 10/1999 |
| JP | 2000509528 T | 7/2000 |
| JP | 2001236496 A | 8/2001 |
| JP | 2001306321 A | 11/2001 |
| JP | 2003005958 A | 1/2003 |
| JP | 2005531848 T | 10/2005 |

OTHER PUBLICATIONS

Structured Computer Organization, Andrew S. Tanenbaum, 1984, Prentice-Hall, Inc., 2nd Edition, pp. 10-11.*

Beebe B et al., "Instruction Sequencing Control" IBM Technical Disclosure Bulletin, IBM Corp., New York, US, XP-001032127.

International Search Report dated May 19, 2006.

Beebe, B.O. et al., "Instruction Sequencing Control," IBM Technical Disclosure Bulletin, May 19, 1972, pp. 3599-3611, vol. 14, No. 12, XP001032127.

Bolotski, et al., "Unifying FPGAs and SIMD Arrays," M.I.T. Transit Project, Feb. 8, 1994, pp. 1-22, Transit Note #95.

Stokes, "A Brief Look at the PowerPC 970," Ars Technica, 2002, pp. 1-3.

Alippi, et al., "Determining the Optimum Extended Instruction-Set Architecture for Application Specific Reconfigurable VLIW CPUs," IEEE, 2001, pp. 50-56.

European Search Report; Oct. 21, 2009.

Hennessy, John and Patterson, David. "Computer Architecture: A Quantitative Approach". Unknown Edition, May 2003. pp. 127-130 and D-1 through D-14.

Japanese related case, Japanese Application No. 2007-505612 Office Action dated Mar. 11, 2011, 10 pages.

* cited by examiner

METHOD AND APPARATUS FOR SEPARATE CONTROL PROCESSING AND DATA PATH PROCESSING IN A DUAL PATH PROCESSOR WITH A SHARED LOAD/STORE UNIT

TECHNICAL FIELD

This invention relates to a computer processor, a method of operating the same, and a computer program product comprising an instruction set for the computer.

BACKGROUND

In order to increase the speed of computer processors, prior art architectures have used dual execution paths for executing instructions. Dual execution path processors can operate according to a single instruction multiple data (SIMD) principle, using parallelism of operations to increase processor speed.

However, despite use of dual execution paths and SIMD processing, there is an ongoing need to increase processor speed. Typical dual execution path processors use two substantially identical channels, so that each channel handles both control code and datapath code. While known processors support a combination of 32-bit standard encoding and 16-bit "dense" encoding, such schemes suffer from several disadvantages, including a lack of semantic content in the few bits available in a 16-bit format.

Furthermore, conventional general purpose digital signal processors are not able to match application specific algorithms for many purposes, including performing specialized operations such as convolution, Fast Fourier Transforms, Trellis/Viterbi encoding, correlation, finite impulse response filtering, and other operations.

SUMMARY

In one embodiment according to the invention, there is provided a computer processor. The computer processor comprises: (a) a decode unit for decoding a stream of instruction packets from a memory, each instruction packet comprising a plurality of instructions; (b) a first processing channel comprising a plurality of functional units and operable to perform control processing operations; and (c) a second processing channel comprising a plurality of functional units and operable to perform data processing operations; wherein the decode unit is operable to receive an instruction packet and to detect if the instruction packet defines (i) a plurality of control instructions or (ii) a plurality of instructions one or more of which is a data processing instruction, and wherein when the decode unit detects that the instruction packet comprises a plurality of control instructions said control instructions are supplied to the first processing channel for execution in program order.

In related embodiments, the decode unit of the computer processor may be operable to detect an instruction packet comprising three control instructions and control the control process to execute each of the three control instructions in the order in which they appear in the instruction packet. The decode unit may also be operable to detect an instruction packet containing a plurality of control instructions of equal length; or to detect, within an instruction packet, a control instruction of a bit length between 18 and 24 bits; and in particular, to detect a plurality of control instructions each having a bit length of 21 bits. The decode unit may be operable to receive and decode instruction packets of a bit length of 64 bits.

In further related embodiments, the decode unit may be operable to detect when there is at least one data processing instruction in the instruction packet and, in response thereto, to cause relevant data to be supplied to the data processing channel. The decode unit may also be operable to detect that the instruction packet comprises at least one data processing instruction and a further instruction selected from one or more of: a memory access instruction; a control instruction; and a data processing instruction. The at least one data processing instruction and said further instruction may be executed simultaneously. The second processing channel may be dedicated to the performance of data processing operations, and data processing instructions may be provided in assembly language. The control processing operations may be performed on operands up to a first pre-determined bit width and the data processing operations may be performed on data up to a second pre-determined bit width, the second pre-determined bit width being larger than the first pre-determined bit width.

In further related embodiments, the first processing channel may comprise units selected from one or more of: a control register file; a control execution unit; a branch execution unit and a load/store unit. The second processing channel may comprise a data execution path including a configurable data execution unit. The second processing channel may also comprise a data execution path including a fixed data execution unit. In use, one or more of the configurable and fixed data execution units may operate according to single instruction multiple data principles. The data processing channel may comprise one or more of a data register file and a load/store unit. A single load/store unit may be accessed by both the control processing channel and the data processing channel through respective ports.

In further related embodiments, the decode unit may be operable to detect an instruction packet comprising at least one data processing instruction, wherein the bit length of the at least one data processing instruction is between 30 and 38 bits; for example, the bit length may be 34 bits. The decode unit may also be operable to detect an instruction packet comprising a data processing operation and a memory access instruction. The bit length of said memory access instruction may be, for example, 28 bits. The decode unit may also be operable to detect an instruction packet comprising a data processing instruction and a control processing instruction. The control processing instruction may be in C code or a variant thereof. The decode unit may also be operable to detect a data processing instruction in assembly language.

In another embodiment according to the invention, there is provided a method of operating a computer processor which comprises first and second processing channels, each having a plurality of functional units, wherein the first processing channel is capable of performing control processing operations and the second processing channel is capable of performing data processing operations. The method comprises: (a) receiving a sequence of instruction packets from a memory, each of said instruction packets comprising a plurality of instructions defining operations; (b) decoding each instruction packet in turn by determining if the instruction packet defines: (i) a plurality of control instructions; or (ii) at least one data processing instruction; and wherein when the decode unit detects that the instruction packet comprises a plurality of control instructions, supplying said plurality of control instructions to said first processing channel for execution in the sequence.

In another embodiment according to the invention, there is provided a computer program product comprising program code means for causing a computer to be operated according to the preceding method.

In a further embodiment according to the invention, there is provided a computer program code, comprising a sequence of instructions for causing a computer to be operated according to the preceding method.

In another embodiment according to the invention, there is disclosed an instruction set for a computer including a first class of instruction packets each comprising a plurality of control instructions for execution sequentially and a second class of instruction packets each comprising at least a data processing instruction and a further instruction for execution contemporaneously, said further instruction being selected from one or more of: a memory access instruction; a control instruction; and a data processing instruction.

Additional advantages and novel features of the invention will be set forth in part in the description which follows, and in part will become apparent to those skilled in the art upon examination of the following and the accompanying drawings; or may be learned by practice of the invention.

BRIEF DESCRIPTION OF THE DRAWINGS

For a better understanding of the present invention, and to show how the same may be carried into effect, reference will now be made, by way of example only, to the accompanying drawings, in which.

DETAILED DESCRIPTION

Figure 1:
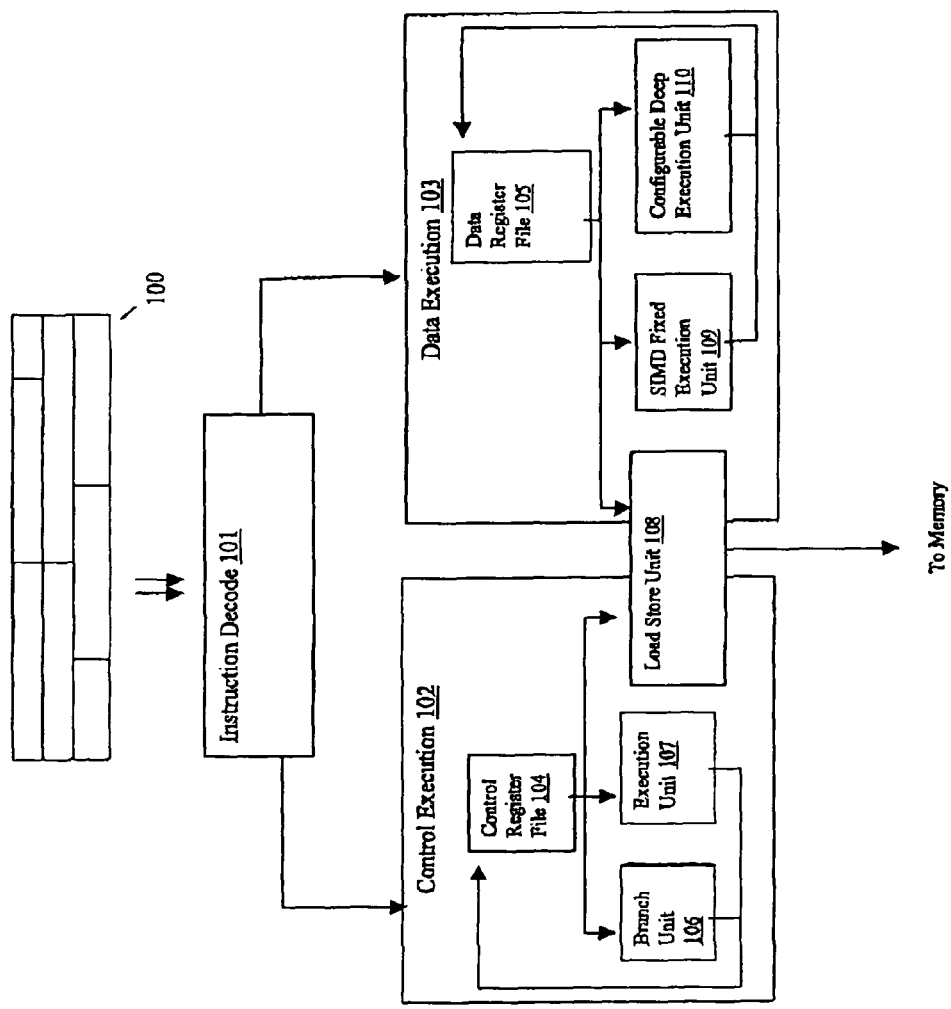
FIG. 1 is a block diagram of an asymmetric dual execution path computer processor, according to an embodiment of the invention.

FIG. 1 is a block diagram of an asymmetric dual path computer processor, according to an embodiment of the invention. The processor of FIG. 1 divides processing of a single instruction stream 100 between two different hardware execution paths: a control execution path 102, which is dedicated to processing control code, and a data execution path 103, which is dedicated to processing data code. The data widths, operators, and other characteristics of the two execution paths 102, 103 differ according to the different characteristics of control code and datapath code. Typically, control code favors fewer, narrower registers, is difficult to parallelize, is typically (but not exclusively) written in C code or another high-level language, and its code density is generally more important than its speed performance. By contrast, datapath code typically favors a large file of wide registers, is highly parallelizable, is written in assembly language, and its performance is more important than its code density. In the processor of FIG. 1, the two different execution paths 102 and 103 are dedicated to handling the two different types of code, with each side having its own architectural register file, such as control register file 104 and data register file 105, differentiated by width and number of registers; the control registers are of narrower width, by number of bits (in one example, 32-bits), and the data registers are of wider width (in one example, 64-bits). The processor is therefore asymmetric, in that its two execution paths are different bit-widths owing to the fact that they each perform different, specialised functions.

In the processor of FIG. 1, the instruction stream 100 is made up of a series of instruction packets. Each instruction packet supplied is decoded by an instruction decode unit 101, which separates control instructions from data instructions, as described further below. The control execution path 102 handles control-flow operations for the instruction stream, and manages the machine's state registers, using a branch unit 106, an execution unit 107, and a load store unit 108, which in this embodiment is shared with the data execution path 103. Only the control side of the processor need be visible to a compiler for the C, C++, or Java language, or another high-level language compiler. Within the control side, the operation of branch unit 106 and execution unit 107 is in accordance with conventional processor design known to those of ordinary skill in the art.

The data execution path 103 employs SIMD (single instruction multiple data) parallelism, in both a fixed execution unit 109 and a configurable deep execution unit 110. As will be described further below, the configurable deep execution unit 110 provides a depth dimension of processing, to increase work per instruction, in addition to the width dimension used by conventional SIMD processors.

If the decoded instruction defines a control instruction it is applied to the appropriate functional unit on the control execution path of the machine (e.g. branch unit 106, execution unit 107, and load/store unit 108). If the decoded instruction defines an instruction with either a fixed or configurable data processing operation it is supplied to the data processing execution path. Within the data instruction part of the instruction packet designated bits indicate whether the instruction is a fixed or configurable data processing instruction, and in the case of a configurable instruction further designated bits define configuration information. In dependence on the subtype of decoded data processing instruction, data is supplied to either the fixed or the configurable execution sub-paths of the data processing path of the machine.

Herein, "configurable" signifies the ability to select an operator configuration from amongst a plurality of predefined ("pseudo-static") operator configurations. A pseudo-static configuration of an operator is effective to cause an operator (i) to perform a certain type of operation, or (ii) to be interconnected with associated elements in a certain manner, or (iii) a combination of (i) or (ii) above. In practice, a selected pseudo-static configuration may determine the behavior and interconnectivity of many operator elements at a time. It can also control switching configurations associated with the data path. In a preferred embodiment, at least some of the plurality of pseudo-static operator configurations are selectable by an operation-code portion of a data processing instruction, as will be illustrated further below. Also in accordance with embodiments herein, a "configurable instruction" allows the performance of customized operations at the level of multibit values; for example, at the level of four or more bit multibit values, or at the level of words.

It is pointed out that both control and data processing instructions, performed on their respective different sides of the machine, can define memory access (load/store) and basic arithmetic operations. The inputs/operands for control operations may be supplied to/from the control register file 104, whereas the data/operands for data processing operations are supplied to/from the register file 105.

In accordance with an embodiment of the invention, at least one input of each data processing operation can be a vector. In this respect, the configurable operators and/or switching circuitry of the configurable data pack can be regarded as configurable to perform vector operations by virtue of the nature of operation performed and/or interconnectivity therebetween. For example, a 64-bit vector input to a data processing operation may include four 16-bit scalar operands. Herein, a "vector" is an assembly of scalar operands. Vector arithmetic may be performed on a plurality of scalar operands, and may include steering, movement, and permutation of scalar elements. Not all operands of a vector operation need be vectors; for example, a vector operation may have both a scalar and at least one vector as inputs; and output a result that is either a scalar or a vector.

Herein, "control instructions" include instructions dedicated to program flow, and branch and address generation; but not data processing. "Data processing instructions" include instructions for logical operations, or arithmetic operations for which at least one input is a vector. Data processing instructions may operate on multiple data instructions, for example in SIMD processing, or in processing wider, short vectors of data elements. The essential functions of control instructions and data instructions just mentioned do not overlap; however, a commonality is that both types of code have logic and scalar arithmetic capabilities.

Figure 2:
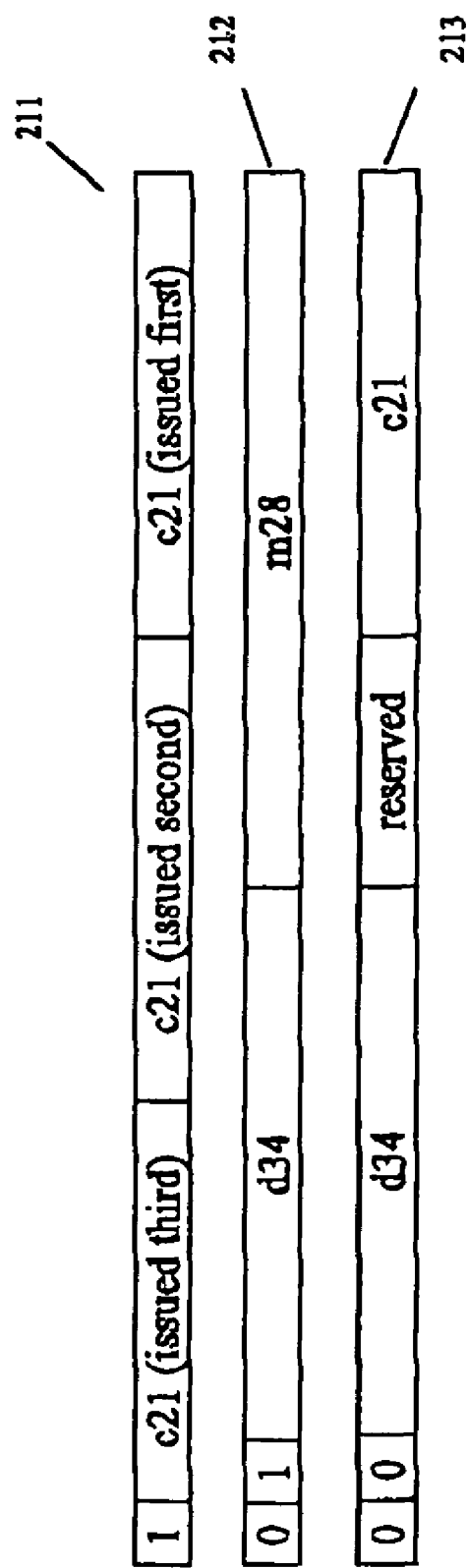
FIG. 2 shows exemplary classes of instructions for the processor of FIG. 1, according to an embodiment of the invention.

FIG. 2 shows three types of instruction packet for the processor of FIG. 1. Each type of instruction packet is 64-bits long. Instruction packet 211 is a 3-scalar type, for dense control code, and includes three 21-bit control instructions (c21). Instruction packets 212 and 213 are LIW (long instruction word) type, for parallel execution of datapath code. In this example each instruction packet 212, 213 includes two instructions but different numbers may be included if desired. Instruction packet 212 includes a 34-bit data instruction (d34) and a 28-bit memory instruction (m28); and is used for parallel execution of data-side arithmetic (the d34 instruction) with a data-side load-store operation (the m28 instruction). Memory-class instructions (m28) can be read from, or written to, either the control side or the data side of the processor, using addresses from the control side. Instruction packet 213 includes a 34-bit data instruction (d34) and a 21-bit control instruction (c21); and is used for parallel execution of data-side arithmetic (the d34 instruction) with a control-side operation (the c21 instruction), such as a control-side arithmetic, branching, or load-store operation.

Instruction decode unit 101 of the embodiment of FIG. 1 uses the initial identification bits, or some other designated identification bits at predetermined bit locations, of each instruction packet to determine which type of packet is being decoded. For example, as shown in FIG. 2, an initial bit "1" signifies that an instruction packet is of a scalar control instruction type, with three control instructions; while initial bits "0 1" and "0 0" signify instruction packets of type 212 and 213, with a data and memory instruction in packet 212 or a data and control instruction in packet 213. Having decoded the initial bits of each instruction packet, the decode unit 101 of FIG. 1 passes the instructions of each packet appropriately to either the control execution path 102 or the data execution path 103, according to the type of instruction packet.

In order to execute the instruction packets of FIG. 2, the instruction decode unit 101 of the processor of the embodiment of FIG. 1 fetches program packets from memory sequentially; and the program packets are executed sequentially. Within an instruction packet, the instructions of packet 211 are executed sequentially, with the 21-bit control instruction at the least significant end of the 64-bit word being executed first, then the next 21-bit control instruction, and then the 21-bit control instruction at the most-significant end. Within instruction packets 212 and 213, the instructions can be executed simultaneously (although this need not necessarily be the case, in embodiments according to the invention). Thus, in the program order of the processor of the embodiment of FIG. 1, the program packets are executed sequentially; but instructions within a packet can be executed either sequentially, for packet type 211, or simultaneously, for packet types 212 and 213. Below, instruction packets of types 212 and 213 are abbreviated as MD and CD-packets respectively (containing one memory and one data instruction; and one control instruction and one data instruction, respectively).

In using 21-bit control instructions, the embodiment of FIG. 1 overcomes a number of disadvantages found in processors having instructions of other lengths, and in particular processors that support a combination of 32-bit standard encoding for data instructions and 16-bit "dense" encoding for control code. In such dual 16/32-bit processors, there is a redundancy arising from the use of dual encodings for each instruction, or the use of two separate decoders with a means of switching between encoding schemes by branch, fetch address, or other means. This redundancy is removed by using a single 21-bit length for all control instructions, in accordance with an embodiment of the invention. Furthermore, use of 21-bit control instructions removes disadvantages arising from insufficient semantic content in a 16-bit "dense" encoding scheme. Because of insufficient semantic content, processors using a 16-bit scheme typically require some mix of design compromises, such as: use of two-operand destructive operations, with corresponding code bloat for copies; use of windowed access to a subset of the register file, with code bloat for spill/fill or window pointer manipulation; or frequent reversion to the 32-bit format, because not all operations can be expressed in the very few available opcode bits in a 16-bit format. These disadvantages are alleviated by use of 21-bit control instructions, in an embodiment of the invention.

A large variety of instructions may be used, in accordance with an embodiment of the invention. For example, instruction signatures may be any of the following, where C-format, M-format, and D-format signify control, memory access, and data format respectively:

| Instruction Signature | Arguments | Used By |
|---|---|---|
| instr | Instruction has no arguments | C-format only |
| instr dst | Instruction has a single destination argument | C-format only |
| instr src0 | Instruction has a single source argument | C- or D-format only |
| instr dst, src0 | Instruction has single destination, single source argument | D- and M-format instructions |
| instr dst, src0, src1 | Instruction has a single destination argument and two source arguments | C-, D-, and M-format instructions |

Also in accordance with one embodiment of the invention, the C-format instructions all provide SISD (single instruction single data) operation, while the M-format and D-format instructions provide either SISD or SIMD operation. For example, control instructions may provide general arithmetic, comparison, and logical instructions; control flow instructions; memory loads and store instructions; and others. Data instructions may provide general arithmetic, shift, logical, and comparison instructions; shuffle, sort, byte extend, and permute instructions; linear feedback shift register instructions; and, via the configurable deep execution unit 110 (described further below), user-defined instructions. Memory instructions may provide memory loads and stores; copy selected data registers to control registers; copy broadcast control registers to data registers; and immediate to register instructions.

In accordance with an embodiment of the invention, the processor of FIG. 1 features a first, fixed data execution path and a second configurable data execution path. The first data path has a fixed SIMD execution unit split into lanes in a similar fashion to conventional SIMD processing designs. The second data path has a configurable deep execution unit 110. "Deep execution" refers to the ability of a processor to perform multiple consecutive operations on the data provided by a single issued instruction, before returning a result to the register file. One example of deep execution is found in the conventional MAC operation (multiply and accumulate), which performs two operations (a multiplication and an addition), on data from a single instruction, and therefore has a depth of order two. Deep execution is characterized by the number of operands input being equal to the number of results output; or, equivalently, the valency-in equals the valency-out. Thus, for example, a conventional two-operand addition, which has one result, is not an example of deep execution, because the number of operands is not equal to the number of results; whereas convolution, Fast Fourier Transforms, Trellis/Viterbi encoding, correlators, finite impulse response filters, and other signal processing algorithms are examples of deep execution. Application-specific digital signal processing (DSP) algorithms do perform deep execution, typically at the bit level and in a memory-mapped fashion. However, conventional register-mapped general purpose DSP's do not perform deep execution, instead executing instructions at a depth of order two at most, in the MAC operation. By contrast, the processor of FIG. 1 provides a register-mapped general purpose processor that is capable of deep execution of dynamically configurable word-level instructions at orders greater than two. In the processor of FIG. 1, the nature of the deep execution instruction (the graph of the mathematical function to be performed) can be adjusted/customised by configuration information in the instruction itself. In the preferred embodiment, format instructions contain bit positions allocated to configuration information. To provide this capability, the deep execution unit 110 has configurable execution resources, which means that operator modes, interconnections, and constants can be uploaded to suit each application. Deep execution adds a depth dimension to the parallelism of execution, which is orthogonal to the width dimension offered by the earlier concepts of SIMD and LIW processing; it therefore represents an additional dimension for increasing work-per-instruction of a general purpose processor.

Figure 3:
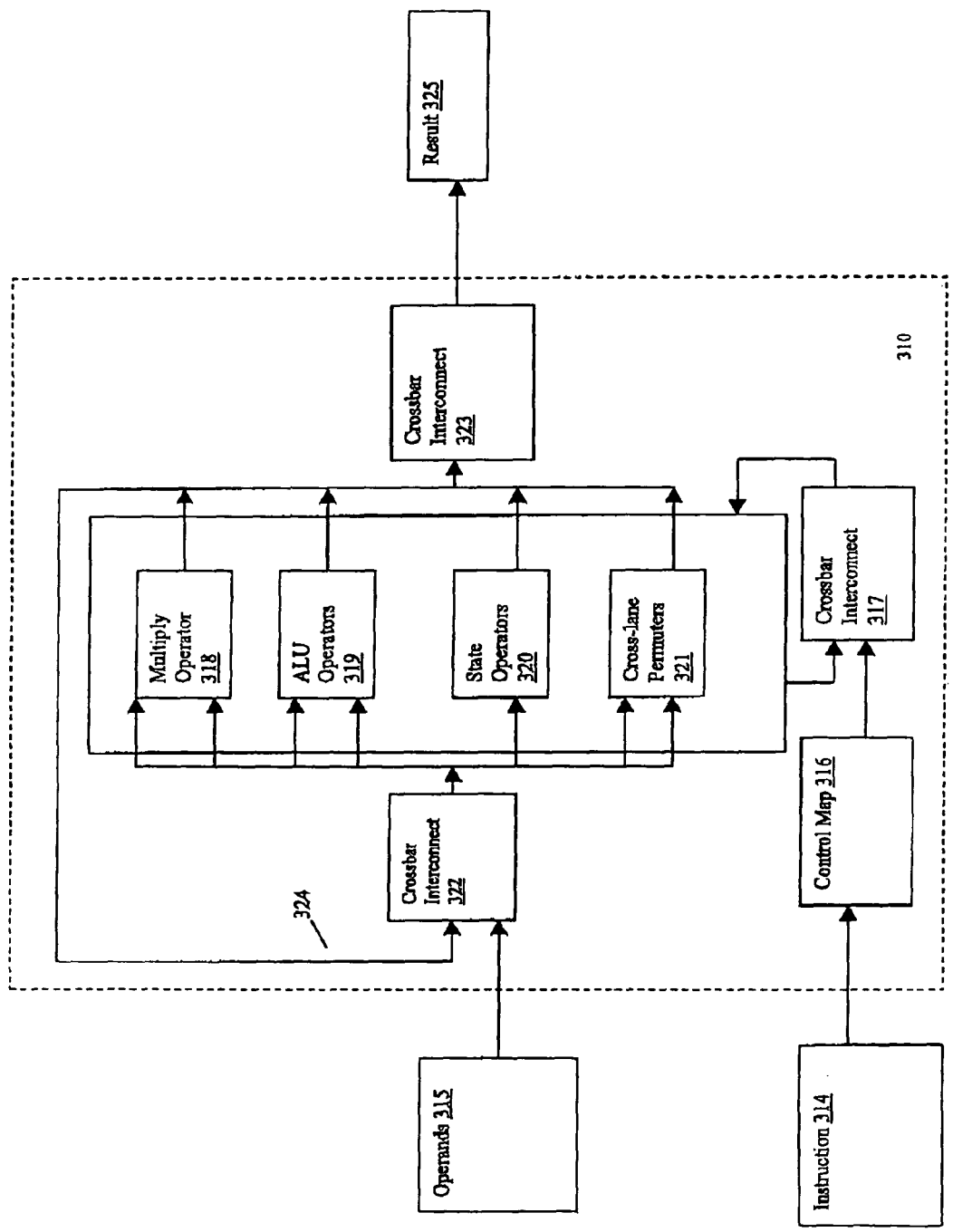
FIG. 3 is a schematic showing components of a configurable deep execution unit, in accordance with an embodiment of the invention.

FIG. 3 shows the components of a configurable deep execution unit 310, in accordance with an embodiment of the invention. As shown in FIG. 1, the configurable deep execution unit 110 is part of the data execution path 103, and may therefore be instructed by data-side instructions from the MD and CD-instruction packets 212 and 213 of FIG. 2. In FIG. 3, an instruction 314 and operands 315 are supplied to the deep execution unit 310 from instruction decode unit 101 and data register file 105 of FIG. 1. A multi-bit configuration code in the instruction 314 is used to access a control map 316, which expands the multi-bit code into a relatively complex set of configuration signals for configuring operators of the deep execution unit. The control map 316 may, for example, be embodied as a look-up table, in which different possible multi-bit codes of the instruction are mapped to different possible operator configurations of the deep execution unit. Based on the result of consulting the look-up table of the control map 316, a crossbar interconnect 317 configures a set of operators 318-321 in whatever arrangement is necessary to execute the operator configuration indicated by the multi-bit instruction code. The operators may include, for example, a multiply operator 318, an arithmetic logic unit (ALU) operator 319, a state operator 320, or a cross-lane permuter 321. In one embodiment, the deep execution unit contains fifteen operators: one multiply operator 318, eight ALU operators 319, four state operators 320, and two cross-lane permuters 321; although other numbers of operators are possible. The operands 315 supplied to the deep execution unit may be, for example, two 16-bit operands; these are supplied to a second crossbar interconnect 322 which may supply the operands to appropriate operators 318-321. The second crossbar interconnect 322 also receives a feedback 324 of intermediate results from the operator 318-321, which may then in turn also be supplied to the appropriate operator 318-321 by the second crossbar interconnect 322. A third crossbar interconnect 323 multiplexes the results from the operators 318-321, and outputs a final result 325. Various control signals can be used to configure the operators; for example, control map 316 of the embodiment of FIG. 3 need not necessarily be embodied as a single look-up table, but may be embodied as a series of two or more cascaded look-up tables. An entry in the first look-up table could point from a given multi-bit instruction code to a second look-up table, thereby reducing the amount of storage required in each look-up table for complex operator configurations. For example, the first look-up table could be organized into libraries of configuration categories, so that multiple multi-bit instruction codes are grouped together in the first look-up table with each group pointing to a subsequent look-up table that provides specific configurations for each multi-bit code of the group.

In accordance with the embodiment of FIG. 3, the operators are advantageously pre-configured into various operator classes. In practice, this is achieved by a strategic level of hardwiring. An advantage of this approach is that it means that fewer predefined configurations need to be stored, and the control circuitry can be simpler. For example, operators 318 are pre-configured to be in the class of multiply operators; operators 319 are pre-configured as ALU operators; operators 320 are pre-configured as state operators; and operators 321 are pre-configured as cross-lane permuters; and other pre-configured operator classes are possible. However, even though the classes of operators are pre-configured, there is run-time flexibility for instructions to be able to arrange at least: (i) connectivity of the operators within each class; (ii) connectivity with operators from the other classes; (iii) connectivity of any relevant switching means; for the final arrangement of a specific configuration for implementing a given algorithm.

A skilled reader will appreciate that, while the foregoing has described what is considered to be the best mode and where appropriate other modes of performing the invention, the invention should not be limited to specific apparatus configurations or method steps disclosed in this description of the preferred embodiment. Those skilled in the art will also recognize that the invention has a broad range of applications, and that the embodiments admit of a wide range of different implementations and modifications without departing from the inventive concepts. In particular, exemplary bit widths mentioned herein are not intended to be limiting, nor is the arbitrary selection of bit widths referred to as half words, words, long, etc.

What is claimed is:

1. A computer processor, the processor comprising:

(a) a decode unit for decoding a stream of instruction packets from a memory, each instruction packet comprising a plurality of instructions;
(b) a first processing channel comprising a plurality of functional units and operable to perform control processing operations responsive to control instructions dedicated to program flow and branch and address generation;
(c) a second processing channel comprising a plurality of functional units and operable to perform data processing operations;
wherein the decode unit is operable to receive instruction packets sequentially and to detect if each instruction packet is of a first class which defines (i) at least two said control instructions or a second class which defines (ii) a plurality of instructions one or more of which is a data processing instruction, the decode unit using at least one identification bit at a predetermined bit location in the packet for detecting if the instruction packet is of the first or second class, and wherein when the decode unit detects that the instruction packet comprises at least two said control instructions, said control instructions are supplied to the first processing channel for execution in program order, and when the decode unit detects that the instruction packet is of the second class, said plurality of instructions are executed simultaneously, and wherein said control instructions have a bit length less than said data processing instructions.

2. A computer processor according to claim 1, wherein when the decode unit detects that the instruction packet comprises three control instructions, the decode unit is operable to supply each of the three control instructions for execution in the order in which they appear in the instruction packet.

3. A computer processor according to claim 1, wherein the decode unit is operable to detect that the instruction packet contains a plurality of control instructions of equal length.

4. A computer processor according to claim 3, wherein the decode unit is operable to detect that one of the control instructions in the instruction packet is of a bit length between 18 and 24 bits.

5. A computer processor according to claim 4, wherein the decode unit is operable to detect said at least two control instructions each having a bit length of 21 bits.

6. A computer processor according to claim 1, wherein the decode unit is operable to receive and decode instruction packets of a bit length of 64 bits.

7. A computer processor according to claim 1, wherein the decode unit is operable to detect when there is at least one data processing instruction in the instruction packet and, in response thereto, to cause relevant data to be supplied to the second processing channel.

8. A computer processor according to claim 1, wherein the decode unit is operable to detect that the instruction packet of the second class comprises at least one data processing instruction and a further instruction selected from one or more of: a memory access instruction; a control instruction; and a further data processing instruction.

9. A computer processor according to claim 8 wherein, at least one data processing instruction and said further instruction are executed simultaneously.

10. A computer processor according to claim 1, wherein the second processing channel is dedicated to the performance of data processing operations and data processing instructions are provided in assembly language.

11. A computer processor according to claim 1, wherein the control processing operations are performed on operands up to a first predetermined bit width and the data processing operations are performed on data up to a second pre-determined bit width, the second pre-determined bit width being larger than the first pre-determined bit width.

12. A computer processor according to claim 1, wherein the first processing channel comprises units selected from one or more of: a control register file; a control execution unit; a branch execution unit and a load/store unit.

13. A computer processor according to claim 1, wherein the second processing channel comprises a data execution path including a configurable data execution unit.

14. A computer processor according to claim 1, wherein the second processing channel comprises a data execution path including a fixed data execution unit.

15. A computer processor according to claim 13, wherein, in use, the configurable data execution unit operates according to single instruction multiple data principles.

16. A computer processor according to claim 14, wherein, in use, the fixed data execution unit operates according to single instruction multiple data principles.

17. A computer processor according to claim 1, wherein the second processing channel comprises one or more of a data register file and a load/store unit.

18. A computer processor according to claim 1, wherein a single load/store unit is accessed by both the first processing channel and the second processing channel through respective ports.

19. A computer processor according to claim 1, wherein the decode unit is operable to detect that the instruction packet of the second class comprises at least one data processing instruction having a bit length between 30 and 38 bits.

20. A computer processor according to claim 19, wherein the decode unit is operable to detect that the instruction packet of the second class comprises at least one data processing instruction having a bit length of 34 bits.

21. A computer processor according to claim 1, wherein the decode unit is operable to detect that the instruction packet of the second class comprises at least one data processing instruction and a memory access instruction.

22. A computer processor according to claim 21, wherein the bit length of said memory access instruction is 28 bits.

23. A computer processor according to claim 1, wherein the decode unit is operable to detect that the instruction packet of the second class comprises at least one data processing instruction and at least one control instruction.

24. A computer processor according to claim 1, wherein the decode unit is operable to detect that the control instructions are in C code or variant thereof.

25. A computer processor according to claim 1, wherein the decode unit is operable to detect that the data processing instruction is in assembly language.

26. A method of operating a computer processor which comprises first and second processing channels, each having a plurality of functional units, wherein the first processing channel is capable of performing control processing operations responsive to control instructions dedicated to program flow and branch and address generation and the second processing channel is capable of performing data processing operations, the method comprising:
(a) receiving a sequence of instruction packets from a memory, each of said instruction packets comprising a plurality of instructions defining operations;
(b) decoding each instruction packet in turn at a decode unit by determining if the instruction packet is of a first class which defines (i) at least two said control instructions; or is of a second class which defines (ii) at least one data processing instruction, and the decode unit using at least one identification bit at a predetermined bit location in the packet for detecting if the instruction packet is of the first or second class; and wherein when the decode unit detects that the instruction packet comprises at least two said control instructions, supplying said at least two control instructions to said first processing channel for execution in sequence, and when the decode unit detects that the instruction packet is of the second class, said plurality of the instructions are executed simultaneously, and wherein said control instructions have a bit length less than said data processing instructions.

27. A computer program product comprising a computer readable medium bearing a program code, which when processed by a computer, causes the computer to be operated according to the method of claim 26.

28. A computer readable medium bearing a program code, comprising a sequence of instructions for causing a computer to be operated according to the method of claim 26.

29. A computer readable medium bearing an instruction set for a computer including a first class of instruction packets each comprising two or more control instructions for execution sequentially, wherein said control instructions are dedicated to program flow and branch and address generation, and a second class of instruction packets each comprising at least a data processing instruction and a further instruction for execution contemporaneously, wherein instruction packets contain at least one identification bit at a predetermined bit location in the packet for detecting if the instruction packet is of the first or second class, and wherein said control instructions have a bit length less than said data processing instructions.

* * * * *